(12) United States Patent
Kim et al.

(10) Patent No.: US 8,700,794 B2
(45) Date of Patent: Apr. 15, 2014

(54) CHANNEL ADAPTIVE VIDEO TRANSMISSION METHOD, APPARATUS USING THE SAME, AND SYSTEM PROVIDING THE SAME

(75) Inventors: Sung-Kee Kim, Hwaseong-si (KR); Tae-Sung Park, Suwon-si (KR); Sung-Jae Ko, Seoul (KR); Hyeong-Min Nam, Seoul (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 518 days.

(21) Appl. No.: 12/759,255

(22) Filed: Apr. 13, 2010

(65) Prior Publication Data

US 2010/0262712 A1     Oct. 14, 2010

(30) Foreign Application Priority Data

Apr. 13, 2009   (KR) .................... 10-2009-0031903

(51) Int. Cl.
*G06F 15/16*     (2006.01)
*H04L 29/06*     (2006.01)

(52) U.S. Cl.
CPC ................. *H04L 29/06027* (2013.01)
USPC ........... 709/231; 709/230; 709/236; 370/522; 370/464; 370/498; 370/503; 370/509; 370/510; 370/524; 370/514; 375/240.01; 375/240.02; 375/240.03; 375/240.04; 375/240.05; 375/240.06; 375/240.07; 375/240.08; 375/240.09; 375/240.1; 375/240.11; 375/240.12; 375/240.13; 375/240.14; 375/240.15; 375/240.16; 375/240.17; 375/240.18; 375/240.19; 375/240.2; 375/240.21; 375/240.22; 375/240.23; 375/240.24; 375/240.25; 375/240.26; 375/240.27; 375/240.28; 375/240.29; 375/E7.09; 375/242; 375/354; 375/362; 375/365; 375/368; 375/316; 375/340; 375/295; 375/302; 375/308; 348/42; 348/554; 348/699; 348/397.1; 348/398.1; 341/67; 341/51; 341/106; 341/107; 341/143; 382/232; 382/240; 382/235; 382/248; 382/250; 382/251; 382/243

(58) Field of Classification Search
USPC ........ 709/230–231, 236; 375/240.01–240.29, 375/E7.09, 242, 354, 362, 365, 368, 316, 375/340, 295, 302, 308; 348/42, 554, 699, 348/397.1, 398.1; 370/522, 464, 498, 503, 370/509, 510, 524, 514; 382/232, 240, 235, 382/248, 250, 251, 243; 341/67, 51, 341/106–107, 143
See application file for complete search history.

(56) References Cited

U.S. PATENT DOCUMENTS 6,057,884 A  *  5/2000  Chen et al. ............... 375/240.16
6,400,768 B1 *  6/2002  Nagumo et al. ......... 375/240.18

(Continued)

FOREIGN PATENT DOCUMENTS

EP          1478181 A1    11/2004
KR     1020050077874 A     8/2005
KR     1020070039459 A     4/2007

OTHER PUBLICATIONS

International Search Report issued on Oct. 27, 2010 in the International Patent Application No. PCT/KR2010/002244.

*Primary Examiner* — Saket K Daftuar
(74) *Attorney, Agent, or Firm* — Sughrue Mion, PLLC

(57) ABSTRACT

A video transmission method is provided, which includes receiving state information from at least one mobile terminal that intends to perform a video stream service through a wireless network, determining a size of an image by selecting a specified spatial layer bit stream on the basis of the state information of the mobile terminal from a plurality of spatial layer bit streams generated at different bit rates during encoding of the bit stream, selecting a specified time and an SNR layer bit stream by increasing or decreasing time of the image and a layer position of the SNR layer bit stream on the basis of network parameters included in the state information of the mobile terminal, and transmitting the bit stream generated by extracting the specified layer bit stream of the selected layer to the mobile terminal.

15 Claims, 9 Drawing Sheets

(56) References Cited

U.S. PATENT DOCUMENTS

| | | | | |
|---|---|---|---|---|
| 6,414,991 B1* | 7/2002 | Yagasaki et al. | | 375/240.12 |
| 6,434,319 B1* | 8/2002 | Wine | | 386/230 |
| 6,493,387 B1* | 12/2002 | Shin et al. | | 375/240.1 |
| 6,580,759 B1* | 6/2003 | Peng | | 375/240.25 |
| 6,603,883 B1* | 8/2003 | Hamanaka | | 382/239 |
| 6,639,943 B1* | 10/2003 | Radha et al. | | 375/240.11 |
| 6,836,512 B2* | 12/2004 | Van Der Schaar et al. | | 375/240.11 |
| 6,873,655 B2* | 3/2005 | Comer et al. | | 375/240.11 |
| 6,968,091 B2* | 11/2005 | Faibish et al. | | 382/251 |
| 6,996,172 B2* | 2/2006 | Ishtiaq et al. | | 375/240.1 |
| 7,197,070 B1* | 3/2007 | Zhang et al. | | 375/240.01 |
| 7,262,721 B2* | 8/2007 | Jeon et al. | | 341/107 |
| 7,289,506 B1* | 10/2007 | Hannuksela | | 370/394 |
| 7,317,759 B1* | 1/2008 | Turaga et al. | | 375/240.01 |
| 7,463,683 B2* | 12/2008 | Van Der Schaar et al. | | 375/240.1 |
| 7,830,969 B2* | 11/2010 | Wee et al. | | 375/240.29 |
| 7,860,161 B2* | 12/2010 | Xu et al. | | 375/240.11 |
| 7,881,387 B2* | 2/2011 | Han et al. | | 375/240.25 |
| 7,889,937 B2* | 2/2011 | Kirenko | | 382/240 |
| 7,953,882 B2* | 5/2011 | Shukla et al. | | 709/231 |
| 7,966,642 B2* | 6/2011 | Nair et al. | | 725/142 |
| 8,031,776 B2* | 10/2011 | Han | | 375/240.19 |
| 2002/0054578 A1* | 5/2002 | Zhang et al. | | 370/328 |
| 2002/0071486 A1* | 6/2002 | Van Der Schaar et al. | | 375/240.01 |
| 2002/0090138 A1* | 7/2002 | Hamanaka | | 382/239 |
| 2002/0114391 A1* | 8/2002 | Yagasaki et al. | | 375/240.14 |
| 2002/0118750 A1* | 8/2002 | Yagasaki et al. | | 375/240.11 |
| 2002/0136292 A1* | 9/2002 | Li | | 375/240.01 |
| 2002/0181580 A1* | 12/2002 | Van Der Schaar | | 375/240.01 |
| 2003/0016752 A1* | 1/2003 | Dolbear et al. | | 375/240.16 |
| 2003/0050062 A1* | 3/2003 | Chen et al. | | 455/435 |
| 2003/0086622 A1* | 5/2003 | Klein Gunnewiek et al. | | 382/240 |
| 2003/0133502 A1* | 7/2003 | Yagasaki et al. | | 375/240.13 |
| 2004/0062304 A1* | 4/2004 | Dolbear et al. | | 375/240.1 |
| 2004/0139212 A1* | 7/2004 | Mukherjee et al. | | 709/230 |
| 2005/0166245 A1 | 7/2005 | Shin et al. | | |
| 2005/0254575 A1* | 11/2005 | Hannuksela et al. | | 375/240.1 |
| 2006/0158355 A1* | 7/2006 | Jeon et al. | | 341/50 |
| 2007/0033494 A1* | 2/2007 | Wenger et al. | | 714/776 |
| 2007/0183494 A1* | 8/2007 | Hannuksela | | 375/240.1 |
| 2008/0027715 A1* | 1/2008 | Rajendran et al. | | 704/205 |
| 2008/0064425 A1* | 3/2008 | Kim et al. | | 455/466 |
| 2008/0068446 A1* | 3/2008 | Barkley et al. | | 348/14.07 |
| 2008/0104647 A1* | 5/2008 | Hannuksela | | 725/114 |
| 2008/0247460 A1* | 10/2008 | Kang et al. | | 375/240.02 |
| 2010/0054329 A1* | 3/2010 | Bronstein et al. | | 375/240.03 |
| 2010/0074324 A1* | 3/2010 | Qian et al. | | 375/240.02 |
| 2010/0161825 A1* | 6/2010 | Ronca et al. | | 709/231 |
| 2010/0238994 A1* | 9/2010 | Cakareski et al. | | 375/240.01 |
| 2011/0026470 A1* | 2/2011 | Joo et al. | | 370/329 |

* cited by examiner

CHANNEL ADAPTIVE VIDEO TRANSMISSION METHOD, APPARATUS USING THE SAME, AND SYSTEM PROVIDING THE SAME

CROSS REFERENCE TO RELATED APPLICATIONS

This application claims priority under 35 U.S.C. §119(a) to a Korean Patent Application entitled "Channel Adaptive Video Transmission Method, Apparatus Using The Same, And System Providing The Same" filed in the Korean Industrial Property Office on Apr. 13, 2009 and assigned Serial No. 10-2009-0031903, the contents of which are incorporated herein by reference.

BACKGROUND

1. Field

Methods and apparatuses consistent with the exemplary embodiments relate to a channel adaptive video transmission method, an apparatus using the same, and a system providing the same, which adopts an SVC encoding method that can provide an optimum seamless transmission of a high picture quality digital video stream to a user by using state information of a network and a corresponding mobile terminal in a variable wireless environment.

2. Description of the Related Art

In general, with the development of information and communication technology including the internet, video communication has been increasing in addition to text and voice communication. The existing text-centered communication method is insufficient to satisfy diverse desires of consumers, and accordingly, multimedia services that can accommodate various types of information, such as text, image, music, and the like, have been increasing. Multimedia data have massive quantity, and require large-capacity storage medium and wide bandwidth during transmission. Accordingly, in order to transmit the multimedia data including the text, video, and audio, use of a compression coding technique is required.

Scalable video coding (SVC) that is H.264 scalable coding technology is a new scalable coding technique developed to simultaneously solve the problems of low compression efficiency, impossibility of complex scalability support, and high implementation complexity, which are drawbacks of the layer coding based scalability attempted by MPEG-2, MPEG-4, and the like.

The SVC video coding means a coding method which can adjust a video resolution, frame rate, signal-to-noise ratio (SNR), and the like, of a compressed bit stream by cutting a part of the bit stream in accordance with the peripheral conditions such as a transmission bit rate, transmission error rate, system resources, and the like, that is, a coding method which supports diverse scalabilities.

The SVC encodes several video layers into one bit stream. The SVC layers include one base layer and scalable layers that can be continuously filed up on the base layer. In this case, the respective scalable layers have maximum bit rates given thereto based on lower layer information. The respective scalable layers can express the maximum bit rates, frame rates, and resolutions given thereto based on the lower layer information.

Since the SVC can support diverse bit rates, frame rates, and resolutions as many scalable layers are continuously filed up, problems of diverse bandwidths occurring in a heterogeneous network environment, problems of diverse performances and resolutions of a receiving terminal, problems of diverse preferences of content consumers, and the like, can be compositely solved:

FIG. 1 is a view schematically illustrating the configuration of the whole system that provides a video transmission service in the related art. Referring to FIG. 1, the system includes a wireless network 110, a server 112 connected to the wireless network to perform a data service, and a plurality of mobile terminals 114, 116, and 118 communicable with the server 112 through the wireless network 110.

As illustrated in FIG. 1, a corresponding service, once connected to the network through the wireless network 110, can provide only a corresponding service.

SUMMARY OF THE EXEMPLARY EMBODIMENTS

Accordingly, the exemplary embodiments have been made to solve the above-mentioned problems occurring in the prior art, and the exemplary embodiments provide the best video transmission service to a user so that optimum bit streams can be extracted by actively reflecting a connection state with a wireless network and the performance of a corresponding mobile terminal in layer video transmission having diverse scalabilities.

In accordance with an aspect of the exemplary embodiments, there is provided a video transmission method, which includes receiving state information from at least one mobile terminal that intends to perform a video stream service through a wireless network; determining a size of an image by selecting a specified spatial layer bit stream on the basis of the state information of the mobile terminal from a plurality of spatial layer bit streams generated at different bit rates during encoding of the bit stream; selecting a specified time and an SNR layer bit stream by increasing or decreasing the time of the image and a layer position of the SNR layer bit stream on the basis of network parameters included in the state information of the mobile terminal; and transmitting the bit stream generated by extracting the specified layer bit stream of the selected layer to the mobile terminal.

In accordance with another aspect of the exemplary embodiments, there is provided a video transmission apparatus, which includes an encoder encoding a high picture quality digital video stream; a wireless module receiving state information of each mobile terminal through a wireless network; an image size determination unit determining a size of an image by selecting a specified spatial layer bit stream on the basis of the state information of the mobile terminal output from the wireless module from spatial layer bit streams of the video stream output from the encoder; and a control unit selecting a specified time and an SNR layer bit stream from the video stream of which the image size has been determined by increasing or decreasing time of the image and a layer position of the SNR layer bit stream on the basis of network parameters included in the state information of the mobile terminal, and transmitting the bit stream generated by extracting the specified layer bit stream of the selected layer to the mobile terminal.

In accordance with another aspect of the exemplary embodiments, there is provided a system for providing a video transmission service including: a server recognizing network situations and performance of a plurality of mobile terminals using state information received from the mobile terminals through a wireless network, comparing the state information of the mobile terminals with a predetermined threshold value, selecting a specified layer bit stream by increasing or decreasing the layer position of the bit stream for each layer, extracting and transmitting the selected specified layer bit stream to the mobile terminals; and the mobile terminals transmitting their own state information to the server through the wireless network.

BRIEF DESCRIPTION OF THE DRAWINGS

The above and other aspects and features of the exemplary embodiments will be more apparent from the following detailed description taken in conjunction with the accompanying drawings, in which.

DETAILED DESCRIPTION OF THE EXEMPLARY EMBODIMENTS

Hereinafter, exemplary embodiments will be described with reference to the accompanying drawings. In the following description, various specific definitions found in the following description are provided only to help general understanding of the exemplary embodiments, and it is apparent to those skilled in the art that the exemplary embodiments can be implemented without such definitions.

First, for a complete understanding of the exemplary embodiments, the basic principle of the exemplary embodiments will be described. In the exemplary embodiments, a video service signal input based on a stream on a network is encoded to an SVC bit stream, a specified layer image is extracted from several layer images included in the encoded bit stream in accordance with network situations or environments of a mobile terminal, and the bit stream including the extracted layer is transmitted.

Here, the SVC bit stream means one bit stream that includes layer images having various bit rates in accordance with temporal scalability, spatial scalability, and SNR scalability.

Also, in an exemplary embodiment, a wireless network is a wireless broadband internet (WiBro) that supplements merits and demerits of a cellular mobile communication system and IEEE 802.16 based wireless LAN, and a terminal is a mobile terminal (MS) which is connected to the wireless broadband internet and operates according to IEEE 802.16.

In an exemplary embodiment, a network may be a wireless network or a base station that is included in the wireless network, and it is assumed that the size of an image of a video stream to be transmitted is preset in accordance with the performance (e.g. the size of a display screen) of the mobile terminal.

Also, for convenience in explaining the exemplary embodiments, three layers are exemplified. However, it will be apparent to those of ordinary skill in the art that the number of layers is not limited thereto.

In the following description, the mobile terminal means a portable terminal that guarantees mobility, such as a cellular phone, a personal data assistant (PDA), or the like. In the following description, it is assumed that the mobile terminal has the above-described general configuration.

Figure 1:
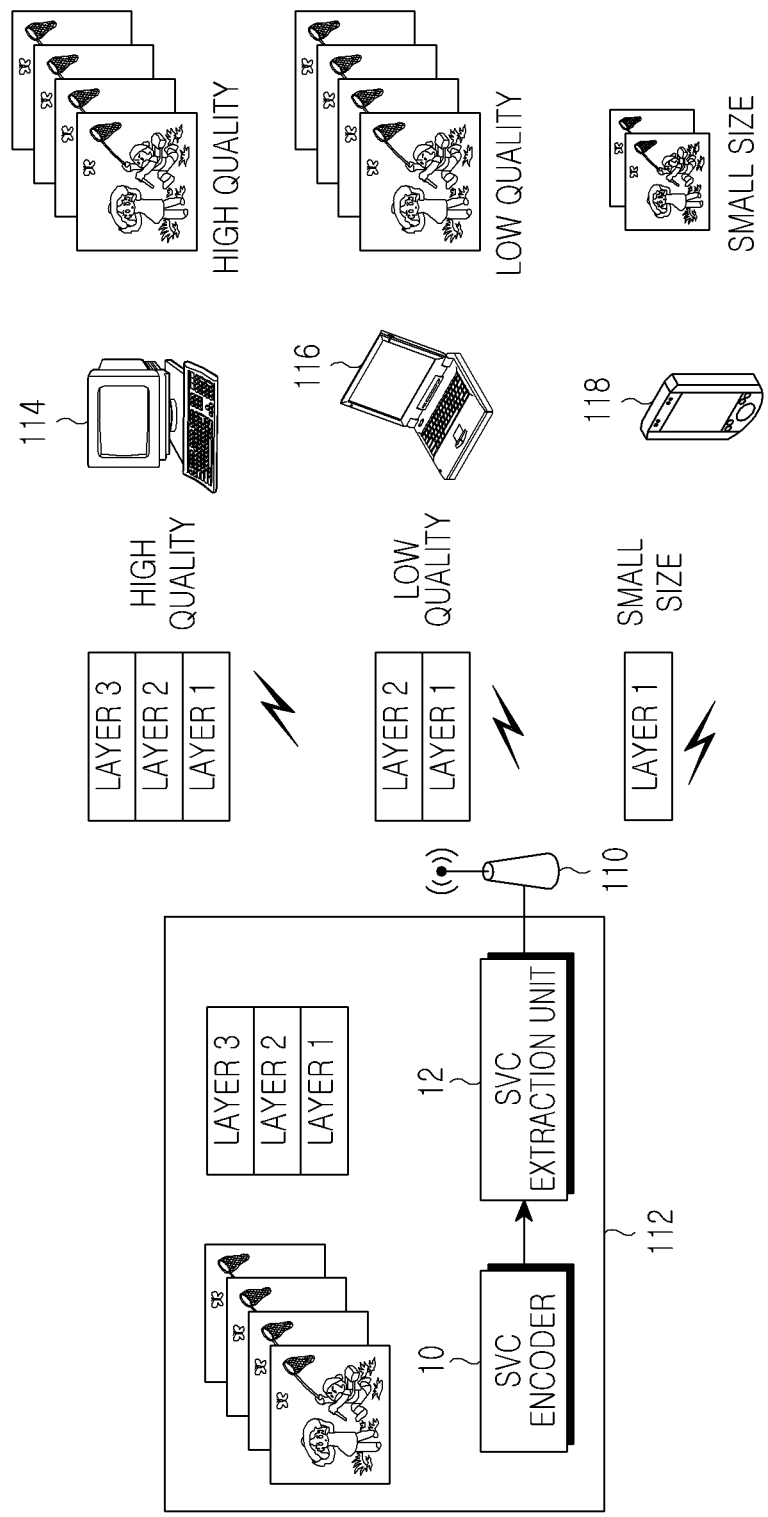
FIG. 1 is a view schematically illustrating the configuration of the whole system that provides a video transmission service in the related art.
Figure 2:
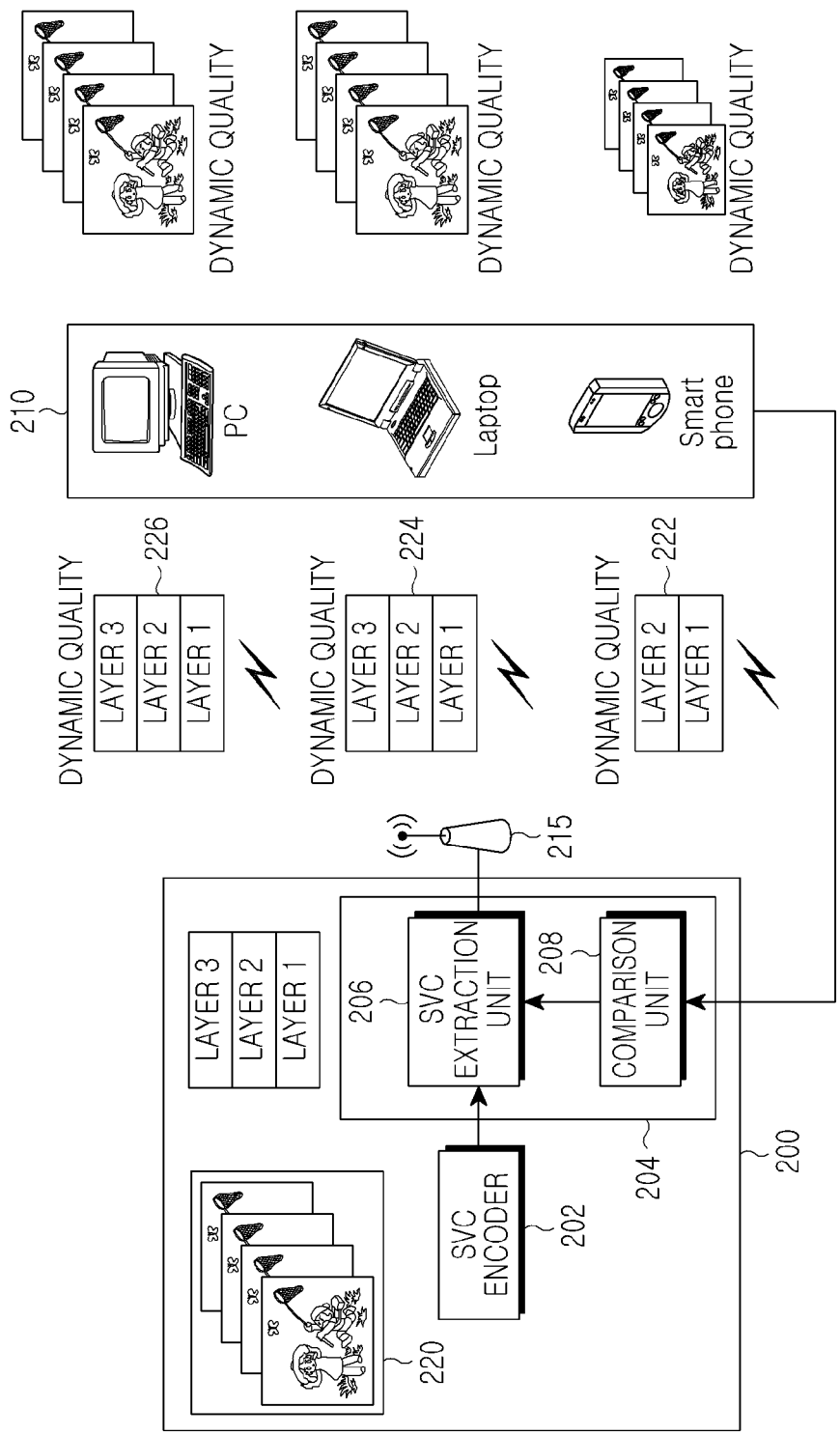
FIG. 2 is a view schematically illustrating the configuration of the whole system that provides a channel adaptive video transmission service according to an exemplary embodiment.

FIG. 2 is a view schematically illustrating the configuration of the whole system that provides a channel adaptive video transmission service according to an exemplary embodiment.

The system to which the exemplary embodiment has been applied includes a wireless network 215, a server 200 connected to the wireless network 215 to perform data service, and a mobile terminal node 210 including a plurality of mobile terminals (e.g. a PC, a laptop, a portable phone, and the like) that is communicable with the server 200 through the wireless network 215.

The server 200 includes an SVC encoder 202 encoding high picture quality digital video streams, a comparison unit 204 comparing a parameter value included in state information of the mobile terminal received from the mobile terminal, such as a buffer state value, a round trip time (RTT) value, or the like, with a predetermined value, and a control unit 204 extracting a specified layer bit stream of a video image on the basis of the result of the comparison acquired through the comparison unit 204 and transmitting a bit stream generated from the extracted bit stream to the mobile terminal node 210 through the wireless network 215.

Here, the specified layer bit stream means a bit stream selected by layers, and one video bit stream may include three layers: a temporal region, a spatial region and an SNR region.

As illustrated in FIG. 2, the SVC encoder 202 encodes a plurality of layers, i.e. temporal, spatial, and SNR layers, generated at different bit rates, and the control unit 204 extracts optimum layer bit streams suitable to the state information of the respective mobile terminals from the SVC encoder 202 and transmits the optimum video bit stream including the extracted bit streams to the corresponding mobile terminal through the wireless network.

In this case, the temporal region means the number of pictures, i.e. the number of frames per second (FPS), which can be seen in one second, and is expressed as 15 FPS, 30 FPS, 60 FPS, or the like.

The spatial region participates in the size of a display screen when the video image is displayed on the screen, and means resolution. Here, the resolution means the number of pixels (e.g. 480*320) included in the display screen. In general, an adaptive service is required in accordance with the size of the screen provided in a specified mobile terminal that receives the video image. For example, in the case of transmitting one video image to a laptop and a small-size mobile terminal, the sizes of the display screens of the laptop and the mobile terminal are different from each other, and thus if the video bit stream included in the spatial region of the same layer is transmitted, at least one terminal cannot guarantee the optimum video quality due to the video bit stream that does not coincide with the display screen.

The SNR region means the definition of the image. As described above, during the SVC video encoding, the server 200 grasps network situations of the respective mobile terminals using the network parameter values included in the state information that is received from the plurality of mobile terminal nodes 210 through the wireless network, recognizes the specification of the respective mobile terminals included in the state information, and transmits the optimum video stream suitable to the respective mobile terminals through a process of comparing the specifications with predetermined threshold values.

Accordingly, since the server 200 transmits the video stream in the unit of best scalability for each layer using the state information of the network and the mobile terminal connected to the network, the optimum bit stream according to the environment of a user terminal and the network environment can be extracted, and the limited network resources can be used efficiently.

Also, in order to receive the optimum video transmission service, each mobile terminal node 210 performs feedback of its own network state information, i.e. its own buffer state that means parameters of the situations of the currently communicating network, and round trip time (RTT) value that means the round trip time of a specified packet to the server 200 through the wireless network and the network, respectively.

The mobile terminal node 210, in order to receive the optimum video transmission service, performs feedback of its own network state information, i.e. its own buffer state, that means parameters of the situations of the currently communicating network, and a value that corresponds to the round trip time of a specified packet, to the server through the wireless network and the network, respectively.

Also, the mobile terminal node 210 performs feedback of specification information that indicates its own performance, i.e. information such as CPU information, memory information, the size of a display screen, the resolution of the display screen, and the like, to the server 200.

Hereinafter, a channel adaptive video transmission method according to an exemplary embodiment will be described through the operation of the server in a system that provides a channel adaptive video transmission service.

Figure 3A:
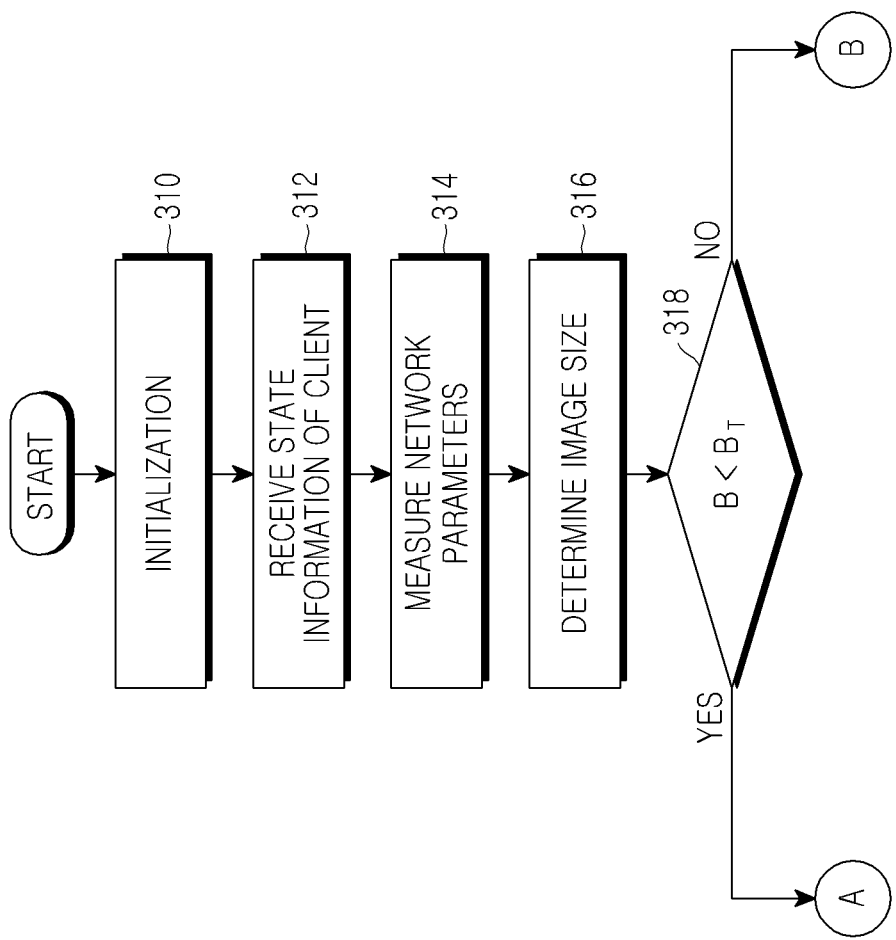
FIGS. 3A and 3B are views explaining an operation of a server in a video transmission system that performs a channel adaptive video transmission service according to an exemplary embodiment.
Figure 3B:
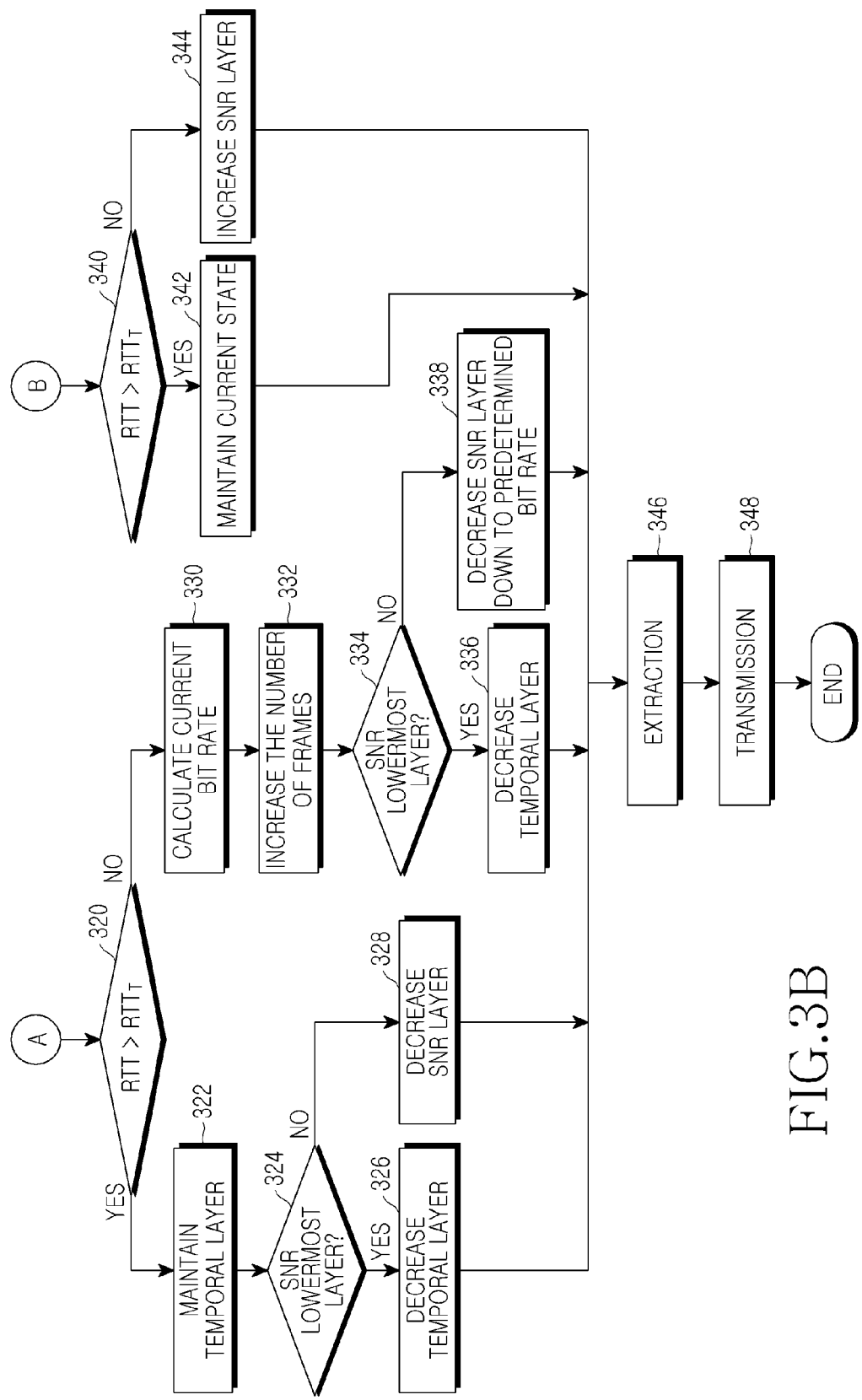

FIGS. 3A and 3B are views explaining an operation of a server in a video transmission system that performs a channel adaptive video transmission service according to an exemplary embodiment.

First, through a server initialization process in operation 310, the state information is received from a plurality of mobile terminals which intend to perform the video stream service in operation 312 through the wireless network.

Here, the state information means performances of the respective mobile terminals, for example, information that includes CPU information, memory information, the size of a display screen, the resolution of the display screen, and the like.

After the state information of the mobile terminal is received through the wireless network, parameters of the network, in which the mobile terminal that intends to perform the video stream service using the state information of the mobile terminal received in operation 314, is measured.

The state information also includes the network state information of the respective mobile terminals, which correspond to RTT parameters indicating the buffer state of the mobile terminal and the round trip time of a packet through the network. Through the buffer state and the RTT value, the situation of the network in which the mobile terminal itself is positioned, i.e. the traffic congestion of the network, can be ascertained.

Also, in operation 316, the size of an image is determined by selecting a specified spatial layer bit stream corresponding to the spatial region from the video bit stream to be transmitted using the size of the display screen that can be acquired from the state information received from the mobile terminal.

In this case, the process of determining the size of the image is preset according to the performance (e.g. the size of the display screen) for each mobile terminal.

If the size of the image is determined in the video bit stream to be transmitted to a specified mobile terminal in operation 316, the buffer state is checked from the network state information of the mobile terminal (operation 318).

The current buffer state B of the corresponding mobile terminal that is received from the mobile terminal is compared with the preset threshold value $B_T$, and if the buffer state is smaller than the threshold value ($B<B_T$), the processing proceeds to "A", while if the buffer state is larger than the threshold value ($B>B_T$), the processing proceeds to "B".

In operation 320, in a state where the buffer state proceeding to "A" is smaller than the threshold value, the RTT parameter value RTT that indicates the round trip time of a packet through the network is compared with the preset threshold value $RTT_T$.

As the result of comparison, if the RTT value is larger than the threshold value ($RTT>RTT_T$), the specified spatial layer bit stream corresponding to the spatial region in operation 316 is selected, and in the current video bit stream of which the size of the image has already been confirmed, the current bit stream in the temporal layer is maintained (operation 322).

That is, since the buffer state is smaller than the threshold value ($B<B_T$) as the result of comparing the buffer state in operation 318, it is recognized that the network situation is not smooth, i.e., there is traffic congestion, and if the RTT value is larger than the threshold value ($RTT>RTT_T$) in operation 320, it is recognized that the situation against the transmission delay is smooth, i.e., there is no traffic congestion. Accordingly, it is not required to increase or decrease the temporal region of the current video stream, i.e. the number of frames per second.

In operation 324, the layer position of the SNR layer bit stream of the current bit stream is checked, and if the layer position of the SNR layer bit stream is the lowermost layer which cannot be further reduced as the result of checking, the processing proceeds to operation 326, and the layer position of the temporal layer bit stream maintained in operation 322 is decreased down to the lower layer.

Also, if the layer position of the SNR layer bit stream is not the lowermost layer as the result of checking, the processing proceeds to operation 328, and the layer position of the current SNR layer bit stream is decreased down to the lower layer.

On the other hand, if the RTT value is smaller than the threshold value ($RTT<RTT_T$) as the result of comparing the WIT value in operation 320, the specified spatial layer bit stream corresponding to the spatial region in operation 316 is selected, and in the current video bit stream of which the size of the image has already been confirmed, the number of frames is increased by calculating the bit rate of the current temporal layer (operation 332).

For example, if the bit rate of the current temporal layer is 60 FPS, the bit rate of 30 FPS is changed to the bit rate of 60 FPS to increase the number of frames which are shown on the screen per second.

That is, since the current RTT value is smaller than the preset $RTT_T$ value and thus the transmission delay through the network is not smooth ($RTT<RTT_T$) when the current buffer state is smaller than the preset value and thus the network situation is not smooth ($B<B_T$), the image shown on the mobile terminal is distinct by increasing the number of frames per second, and thus the seamless video transmission service can be performed by way of precaution against the non-smooth network situations, for example, traffic congestion.

After operation 332 is performed, the layer position of the SNR layer bit stream of the current bit stream is checked, and if the layer position of the SNR layer bit stream is the lowermost layer which cannot be further reduced as the result of checking, the processing proceeds to operation 336, and the number of frames increased in operation 332, i.e. the layer position of the temporal layer bit stream is decreased down to the lower layer.

That is, since the buffer state is smaller than the threshold value ($B<B_T$) as the result of comparing the buffer state in operation 318, it is recognized that the network situation is not smooth, while if the RTT value is smaller than the threshold value ($RTT<RTT_T$) in operation 320, it is recognized that the situations against the transmission delay is not smooth, so that it is required to decrease the temporal region of the current video stream, i.e. the number of frames per second.

Also, if the layer position of the SNR layer bit stream is not the lowermost layer as the result of checking, the processing proceeds to operation 338, and the layer position of the current SNR layer bit stream is decreased down to the lower layer at the predetermined bit rate.

On the other hand, if the buffer state of the current mobile terminal is larger than the predetermined threshold value ($B>B_T$) as the result of comparing the buffer state, the RTT parameter value RTT that indicates the round trip time of the packet through the network is compared with the predetermined threshold value $RTT_T$ through the performing of operation 340.

If the RTT value is larger than the threshold value ($RTT>RTT_T$) as the result of the comparison, the specified spatial layer bit stream corresponding to the spatial region in operation 316 is selected, and in the current video bit stream of which the size of the image has already been confirmed, the current bit stream is maintained with respect to the temporal layer and the SNR layer (operation 342).

That is, since the current buffer state is larger than the predetermined buffer state and thus the network situation is smooth ($B>B_T$) and since the current RTT is larger than the predetermined $RTT_T$ and thus the transmission delay through the network is also smooth ($RTT>RTT_T$), the current bit stream is maintained with respect to the bit streams of the respective layers.

Also, if the RTT value is smaller than the threshold value ($RTT<RTT_T$) as the result of the comparison, the specified spatial layer bit stream corresponding to the spatial region in operation 316 is selected, and in the current video bit stream of which the size of the image has already been confirmed, the layer position of the current SNR layer bit stream is increased up to the upper layer with respect to the SNR layer.

That is, since the current buffer state is larger than the predetermined buffer state and thus the network situation is smooth ($B>B_T$) and since the current RTT is smaller than the predetermined $RTT_T$ value and thus the transmission delay through the network is not smooth ($RTT<RTT_T$), the layer position of the SNR layer bit stream in the current bit stream is increased up to the upper layer.

Through the above-described process, an optimum layer position is selected by adjusting the respective layer positions of the video stream on the basis of the network situation where the mobile terminal that intends to perform the video stream service is located, and the bit stream corresponding to the layer positions selected in the respective layers is extracted (operation 346).

The respective bit streams extracted in operation 346 are generated as one bit stream, and the generated bit stream is transmitted to the mobile terminal (operation 348).

Figure 4A:
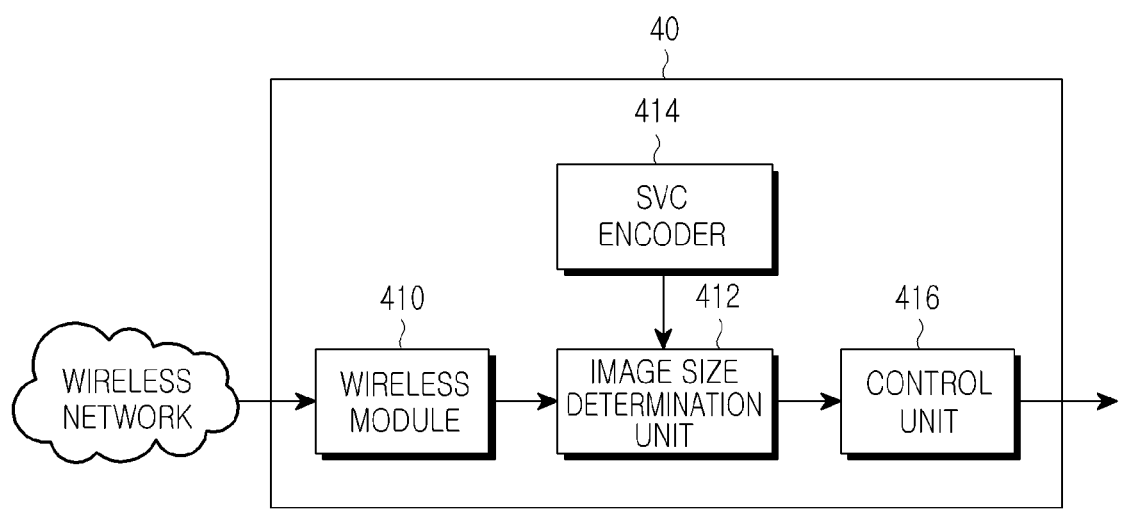
FIGS. 4A and 4B are block diagrams illustrating the configuration of a channel adaptive video transmission apparatus according to an exemplary embodiment.
Figure 4B:
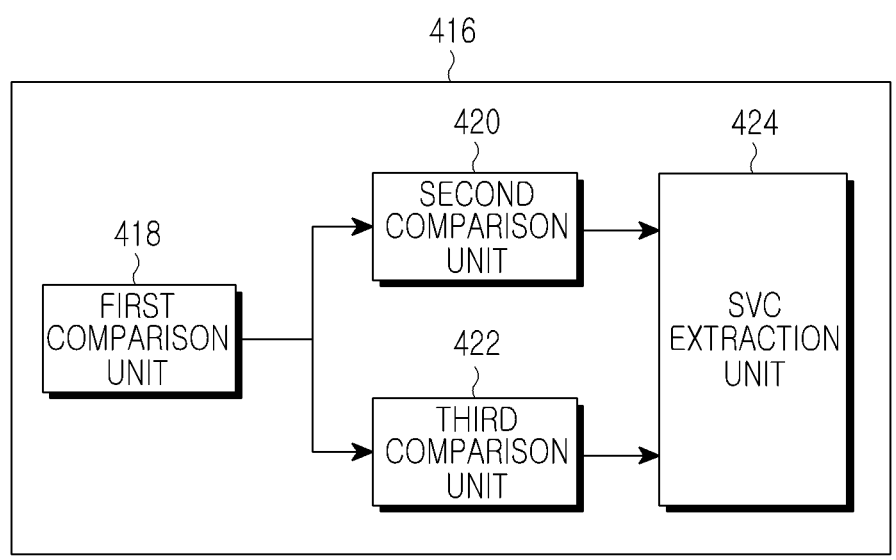

FIGS. 4A and 4B are block diagrams illustrating the configuration of a channel adaptive video transmission apparatus according to an exemplary embodiment.

Referring to FIGS. 4A and 4B, a channel adaptive video transmission apparatus 40 according to an exemplary embodiment includes a wireless module 410, an image size determination unit 4123, an SVC encoder 414, and a control unit 416.

The SVC encoder 414 encodes high-definition digital video streams.

More specifically, if a specified video stream, e.g. a transmission service to be streamed, is a movie, the SVC encoder 414 encodes layers generated at different bit rates, i.e. temporal, spatial, and SNR layers with respect to the image of the movie. For example, the temporal region may be a 60 FPS layer, a 30 FPS layer, or a 15 FPS on the basis of the number of frames per second.

Also, in the spatial region, layers arranged in the order of priority based on the size of an image, i.e. a spatial layer corresponding to the size of an uppermost image, a spatial layer corresponding to the size of an intermediate image, and a spatial layer corresponding to the size of a lowermost image, exist.

Also, in the SNR region, layers arranged in the order of priority based on the definition of an image, i.e. an SNR layer corresponding to an uppermost definition, an SNR layer corresponding to an intermediate definition, and an SNR layer corresponding to a lowermost definition, exist.

The wireless module 410 is connected to an external wireless network, and receives state information from a plurality of mobile terminals through the wireless network.

The state information, which means the performance of the mobile terminal, includes, for example, CPU information, memory information, the size of a display screen, the resolution of the display screen, or the like, and also includes parameter values of a network in which the respective mobile terminals are located.

The image size determination unit 412 selects a specified spatial layer bit stream on the basis of the state information of the mobile terminal output from the wireless module 410 from spatial layer bit streams of the video stream output from the SVC encoder 414.

The spatial layer bit stream of the video stream participates in the size of a display screen when a specified video image is displayed on the screen, and this requires an adaptive service which is based on the size of the screen provided in a specified mobile terminal that receives the video image. For example, in the case of transmitting one video image to a laptop and a small-size mobile terminal, the sizes of the display screens of the laptop and the mobile terminal are different from each other, and thus if the video bit stream included in the spatial region of the same layer is transmitted, at least one terminal cannot guarantee the optimum video quality due to the video bit stream that does not coincide with the display screen.

The control unit 416 selects a specified time and SNR layer bit stream from the video stream of which the size of an image has been determined by the image size determination unit 412 by increasing or decreasing the time of an image and the layer position of the SNR layer bit stream on the basis of the network parameters included in the state information of the mobile terminal, and transmits to the mobile terminal the bit stream generated through extraction of the specified layer bit stream of the selected layer.

Hereinafter, with reference to FIG. 4B, the operation of the control unit 416 will be described in detail.

Referring to the detailed block diagram of the control unit as illustrated in FIG. 4B, the control unit 416 includes a first comparison unit 418, a second comparison unit 420, a third comparison unit 422, and an SVC extraction unit 424.

The first comparison unit 418 compares the buffer state included in the network parameter of the mobile terminal with a predetermined buffer state threshold value. If the predetermined buffer state threshold value is larger than the buffer state value, the first comparison unit 418 outputs the buffer state value to the second comparison unit 420, while if the buffer state threshold value is smaller than the buffer state value, it outputs the buffer state value to the third comparison unit 422.

The second comparison unit 420 compares an RTT value included in the network parameter of the mobile terminal with a predetermined threshold value. If the RTT value is larger than the predetermined threshold value, the second comparison unit 420 discriminates the layer position of the SNR layer bit stream, determines and outputs whether the layer position of the temporal layer bit stream is decreased according to the layer position, while if the RTT value is smaller than the predetermined threshold value, the second comparison unit 420 increases the number of frames by calculating the current bit rate, discriminates the layer position of the SNR layer bit stream, determines and outputs whether the layer position of the temporal layer bit stream is decreased according to the layer position.

More specifically, if the buffer state is smaller than the threshold value, the second comparison unit 420 compares the RTT parameter value RTT that indicates the round trip time of the packet through the network with a predetermined threshold value $RTT_T$.

That is, since the buffer state is smaller than the threshold value ($B<B_T$) as the result of comparing the buffer state by the first comparison unit 418, it is recognized that the network situation is not smooth, i.e., there is traffic congestion, and if the RTT value is larger than the threshold value ($RTT>RTT_T$), it is recognized that the situation against the transmission delay is smooth, i.e., there is no congestion. Accordingly, it is not required to increase or decrease the temporal region of the current video stream, i.e. the number of frames per second.

The second comparison unit 420 checks the layer position of the SNR layer bit stream of the current bit stream, and if the layer position of the SNR layer bit stream is the lowermost layer which cannot be further reduced as the result of checking, the second comparison unit decreases the layer position of the temporal layer bit stream down to the lower layer.

Also, if the layer position of the SNR layer bit stream is not the lowermost layer as the result of checking, the second comparison unit decreases the layer position of the current SNR layer bit stream down to the lower layer.

Also, if the RTT value is smaller than the threshold value ($RTT<RTT_T$), the second comparison unit 420 selects the specified spatial layer bit stream corresponding to the previous spatial region, and increases the number of frames by calculating the bit rate of the current temporal layer in the current video bit stream of which the size of the image has already been confirmed. For example, if the bit rate of the current temporal layer is 60 FPS, the second comparison unit increases the number of frames which are shown on the screen in one second by changing the bit rate of 30 FPS to the bit rate of 60 FPS.

That is, since the current RTT value is smaller than the preset $RTT_T$ value and thus the transmission delay through the network is not smooth ($RTT<RTT_T$) when the current buffer state is smaller than the predetermined buffer state and thus the network situation is not smooth ($B<B_T$), the second comparison unit makes the image shown on the mobile terminal distinct by increasing the number of frames pet second, and thus performs a seamless video transmission service by way of precaution against the non-smooth network situations.

Then, the second comparison unit 420 checks the layer position of the SNR layer bit stream of the current bit stream, and if the layer position of the SNR layer bit stream is the lowermost layer which cannot be further reduced as the result of checking, the second comparison unit decreases the layer position of the temporal layer bit stream down to the lower layer.

That is, since the buffer state is smaller than the threshold value ($B<B_T$) as the result of comparing the buffer state by the first comparison unit 418, it is recognized that the network situation is not smooth, while if the RTT value is smaller than the threshold value ($RTT<RTT_T$), it is recognized that the situations against the transmission delay is not smooth, so that it is required to decrease the temporal region of the current video stream, i.e. the number of frames per second.

Also, if the layer position of the SNR layer bit stream is not the lowermost layer as the result of checking, the layer position of the current SNR layer bit stream down to the lower layer at the predetermined bit rate.

The third comparison unit 422, compares the RTT value included in the network parameter of the mobile terminal with the predetermined threshold value, and if the RTT value is larger than the threshold value, the third comparison unit maintains the current bit stream, while if the RTT value is smaller than the threshold value, the third comparison unit increases and outputs the layer position of the SNR layer bit stream.

More specifically, the third comparison unit 422 compares the buffer state of the current mobile terminal with the predetermined threshold value. If the buffer state is larger than the threshold value ($B>B_T$), the third comparison unit compares the RTT parameter value RTT with the predetermined threshold value $RTT_T$, and if the RTT value is larger than the threshold value ($RTT>RTT_T$) as the result of comparison, the third comparison unit selects the specified spatial layer bit stream corresponding to the spatial region in operation 316, and maintains the current bit stream of which the size of the image has already been confirmed with respect to the temporal layer and the SNR layer.

Also, if the RTT value is smaller than the threshold value ($RTT<RTT_T$) as the result of comparison, the third comparison unit selects the specified spatial layer bit stream corresponding to the previous spatial region, and increases the layer position of the current SNR layer bit stream up to the upper layer with respect to the SNR layer in the current video bit stream of which the size of the image has already been confirmed.

Thereafter, the SVC extraction unit 424 generates one bit stream by extracting the specified layer bit stream output from the second comparison unit 420 and the third comparison unit 422.

On the other hand, in another exemplary embodiment, it is exemplified that a content provider (CP) including diverse types of content, provides the content to the mobile terminal node according to the network situation.

Figure 5:
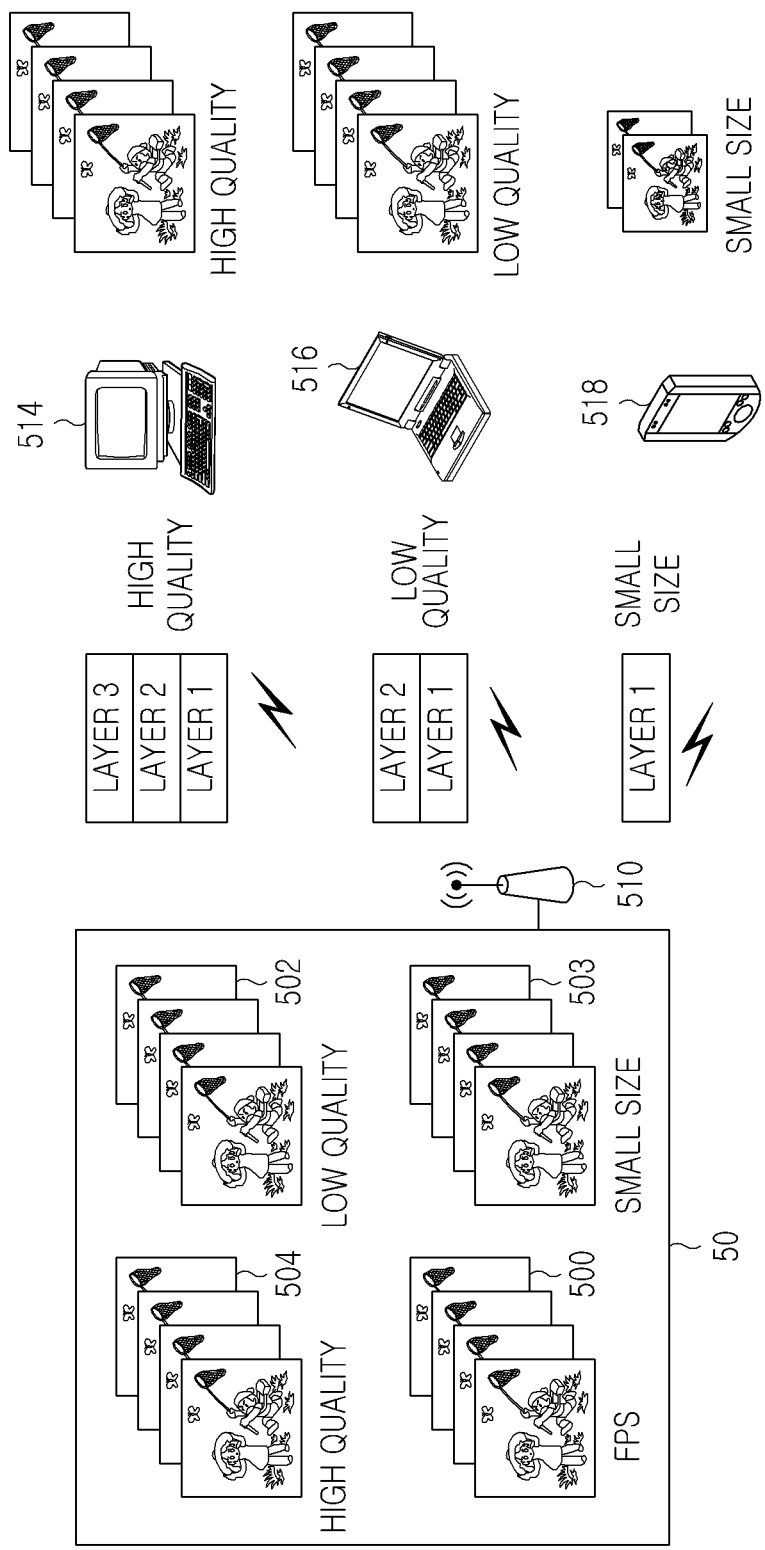
FIG. 5 is a view schematically illustrating the configuration of the whole system that provides a channel adaptive video transmission service according to another exemplary embodiment.

FIG. 5 is a view schematically illustrating the configuration of the whole system that provides a channel adaptive video transmission service according to another exemplary embodiment. Referring to FIG. 5, a content provider 50 according to another exemplary embodiment, classifies and provides diverse types of files. In this case, the diverse types of files include high quality 504, low quality 502, small size 503, and temporal layer files 500. Respective content (files) are classified and stored by size information, frame rate information, and resolution information.

The respective files that the content provider 50 intends to provide are transmitted to a plurality of mobile terminal nodes 514, 516, and 518 through a wireless network 510.

In this case, the content provider 50 receives state information of the mobile terminal nodes before transmission, extracts bit streams according to the optimum type files suitable to the state information of the respective mobile terminals.

In this case, the temporal region means the number of pictures, i.e. the number of frames (FPS) per second, which can be seen in one second, and is expressed as 15 FPS, 30 FPS, 60 FPS, or the like.

The spatial region participates in the size of a display screen when the video image is displayed on the screen, and means resolution. Here, the resolution means the number of pixels (e.g. 480*320) included in the display screen. In general, an adaptive service is required in accordance with the size of the screen provided in a specified mobile terminal that receives the video image. For example, in the case of transmitting one video image to a laptop and a small-size mobile terminal, the sizes of the display screens of the laptop and the mobile terminal are different from each other, and thus if the video bit stream included in the spatial region of the same layer is transmitted, at least one terminal cannot guarantee the optimum video quality due to the video bit stream that does not coincide with the display screen.

The SNR region means the definition of the image.

As described above, the content provider 50 determines network situations of the respective mobile terminals using the network parameter values included in the state information that is received from the plurality of mobile terminal nodes through the wireless network, recognizes the specification of the respective mobile terminals based on the state information, and transmits the optimum video stream suitable to the respective mobile terminals through a process of comparing the specifications with predetermined threshold values.

Since the process of discriminating parameter values for transmission and setting a network is the same as that described with reference to FIG. 3, it will be apparent to a person of ordinary skill in the art to which the exemplary embodiment pertains that it can be applied in the same manner.

Hereinafter, a channel adaptive video transmission method according to an exemplary embodiment will be described through the operation of a server in a system that provides a channel adaptive video transmission service.

Figure 6A:
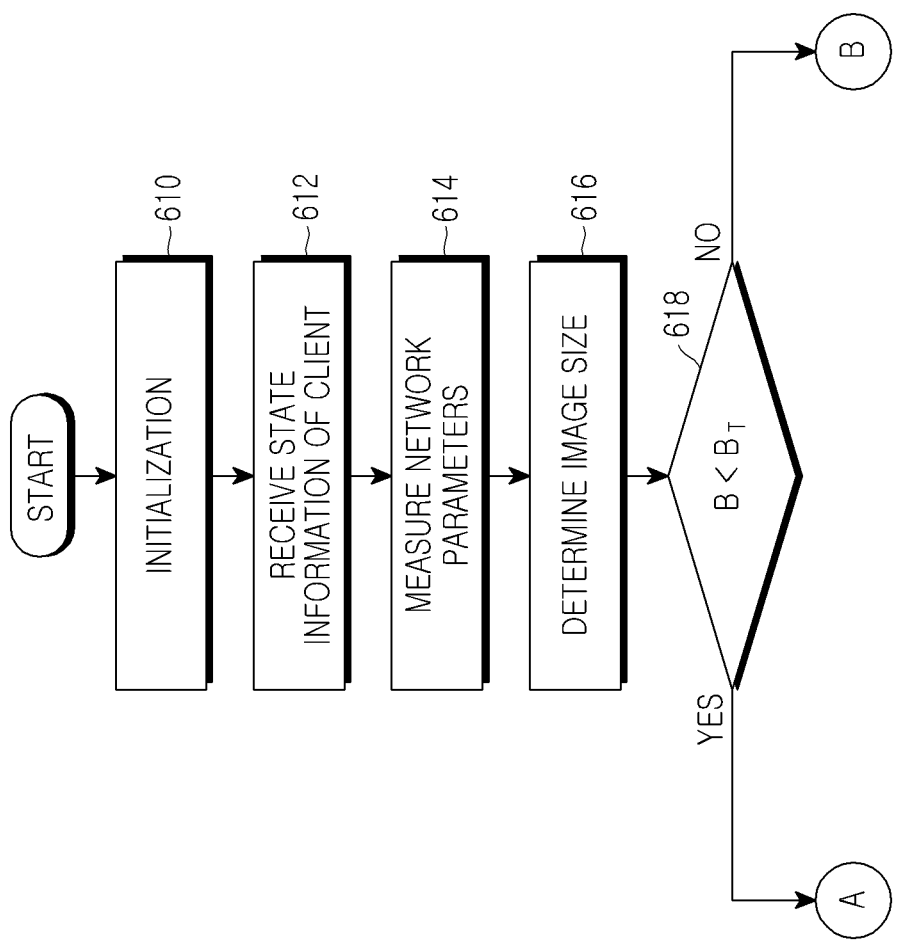
FIGS. 6A and 6B are views explaining an operation of a server in a video transmission system that performs a channel adaptive video transmission service according to another exemplary embodiment.
Figure 6B:
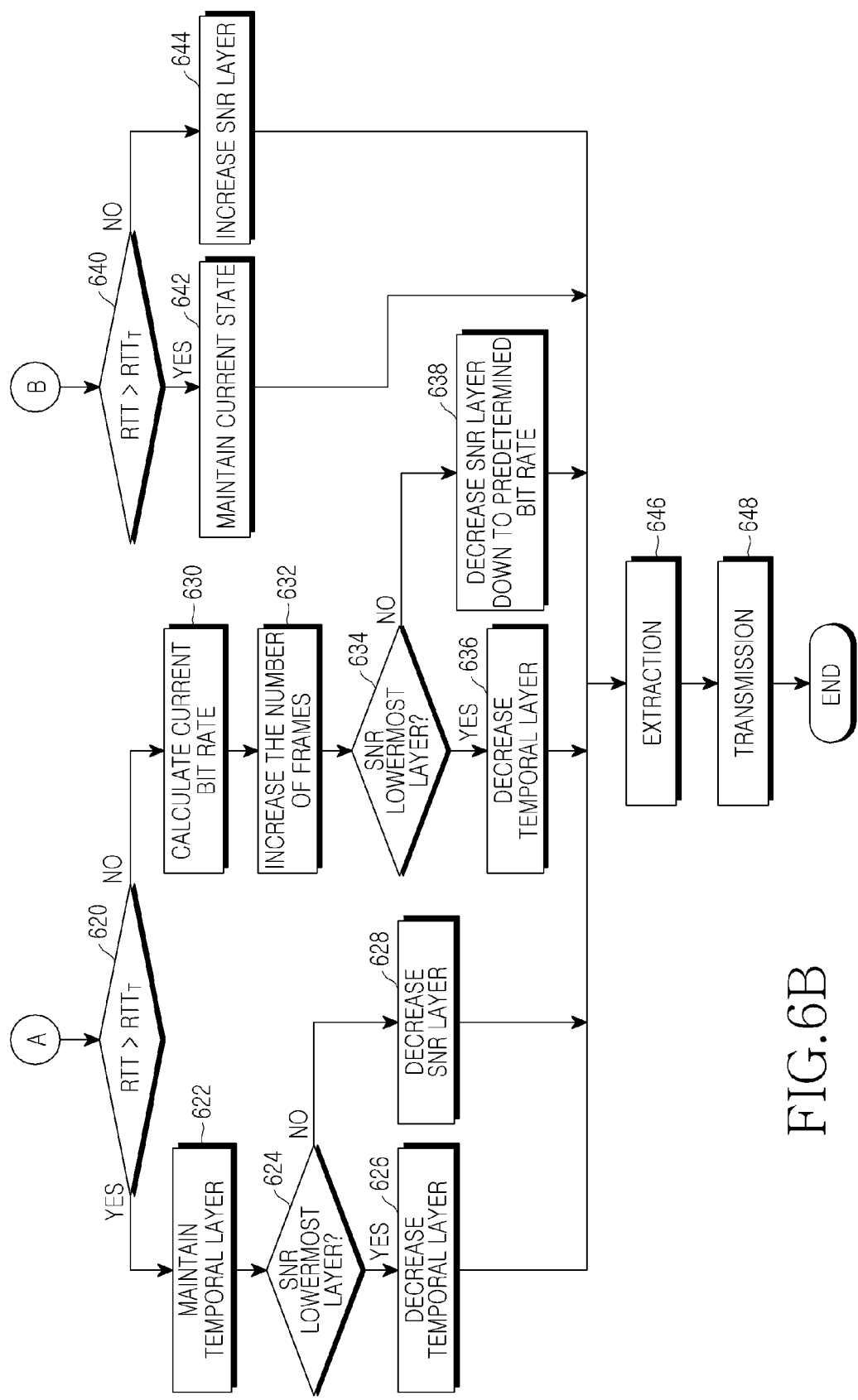

FIGS. 6A and 6B are views explaining an operation of a server in a video transmission system that performs a channel adaptive video transmission service according to another exemplary embodiment.

First, through a server initialization process in operation 610, the state information is received from a plurality of mobile terminals which intend to perform the video stream service in operation 612 through the wireless network.

Here, the state information means performances of the respective mobile terminals, for example, information that includes CPU information, memory information, the size of a display screen, the resolution of the display screen, and the like.

After the state information of the mobile terminal is received through the wireless network, parameters of the network, in which the mobile terminal that intends to perform the video stream service using the state information of the mobile terminal received in operation 614, are measured.

The state information may also include the network state information of the respective mobile terminals, which correspond to RTT parameters indicating the buffer state of the mobile terminal and the round trip time of a packet through the network. Through the buffer state and the RTT value, the situation of the network; i.e. the traffic congestion of the network, in which the mobile terminal itself is positioned, can be ascertained.

Also, in operation 616, the size of an image is determined by selecting a specified spatial layer bit stream corresponding to the spatial region from the video bit stream to be transmitted using the size of the display screen that can be acquired from the state information received from the mobile terminal.

In this case, the process of determining the size of the image is preset according to the performance (e.g. the size of the display screen) for each mobile terminal.

If the size of the image is determined in the video bit stream to be transmitted to a specified mobile terminal in operation 616, the buffer state is checked from the network state information of the mobile terminal (operation 618).

The current buffer state B of the corresponding mobile terminal that is received from the mobile terminal is compared with the preset threshold value $B_T$, and if the buffer state is smaller than the threshold value ($B<B_T$), the processing proceeds to "A", while if the buffer state is larger than the threshold value ($B>B_T$), the processing proceeds to "B".

In operation 620, in a state where the buffer state proceeding to "A" is smaller than the threshold value, the RTT parameter value RTT that indicates the round trip time of a packet through the network is compared with the preset threshold value $RTT_T$.

As the result of comparison, if the RTT value is larger than the threshold value ($RTT>RTT_T$), the specified spatial layer bit stream corresponding to the spatial region in operation 616 is selected, and in the current video bit stream of which the size of the image has already been confirmed, the current bit stream in the temporal layer is maintained (operation 622).

That is, since the buffer state is smaller than the threshold value ($B<B_T$) as the result of comparing the buffer state in operation 618, it is recognized that the network situation is not smooth, and if the RTT value is larger than the threshold value ($RTT>RTT_T$) in operation 620, it is recognized that the situation against the transmission delay is smooth. Accordingly, it is not required to increase or decrease the temporal region of the current video stream, i.e. the number of frames per second.

In operation 624, the layer position of the SNR layer bit stream of the current bit stream is checked, and if the layer position of the SNR layer bit stream is the lowermost layer which cannot be further reduced as the result of checking, the processing proceeds to operation 626, and the layer position of the temporal layer bit stream maintained in operation 622 is decreased down to the lower layer.

Also, if the layer position of the SNR layer bit stream is not the lowermost layer as the result of checking, the processing proceeds to operation 628, and the layer position of the current SNR layer bit stream is decreased down to the lower layer.

On the other hand, if the RTT value is smaller than the threshold value ($RTT<RTT_T$) as the result of comparing the RTT value in operation 620, the specified spatial layer bit stream corresponding to the spatial region in operation 616 is selected, and in the current video bit stream of which the size of the image has already been confirmed, the number of frames is increased by calculating the bit rate of the current temporal layer (operation 632).

For example, if the bit rate of the current temporal layer is 60 FPS, the bit rate of 30 FPS is changed to the bit rate of 60 FPS to increase the number of frames which are shown on the screen per second.

That is, since the current RTT value is smaller than the preset $RTT_T$ value and thus the transmission delay through the network is not smooth ($RTT<RTT_T$) when the current buffer state is smaller than the preset value and thus the network situation is not smooth ($B<B_T$), the image shown on the mobile terminal is distinct by increasing the number of frames per second, and thus the seamless video transmission service can be performed by way of precaution against the non-smooth network situations.

After operation 632 is performed, the layer position of the SNR layer bit stream of the current bit stream is checked, and if the layer position of the SNR layer bit stream is the lowermost layer which cannot be further reduced as the result of checking, the processing proceeds to operation 636, and the number of frames increased in operation 632, i.e. the layer position of the temporal layer bit stream is decreased down to the lower layer.

That is, since the buffer state is smaller than the threshold value ($B<B_T$) as the result of comparing the buffer state in operation 618, it is recognized that the network situation is not smooth, while if the RTT value is smaller than the threshold value ($RTT<RTT_T$) in operation 620, it is recognized that the situations against the transmission delay is not smooth, so that it is required to decrease the temporal region of the current video stream, i.e. the number of frames per second.

Also, if the layer position of the SNR layer bit stream is not the lowermost layer as the result of checking, the processing proceeds to operation 638, and the layer position of the current SNR layer bit stream is decreased down to the lower layer at the predetermined bit rate.

On the other hand, if the buffer state of the current mobile terminal is larger than the predetermined threshold value ($B>B_T$) as the result of comparing the buffer state, the RTT parameter value RTT that indicates the round trip time of the packet through the network is compared with the predetermined threshold value $RTT_T$ through the performing of operation 640.

If the RTT value is larger than the threshold value ($RTT>RTT_T$) as the result of comparison, the specified spatial layer bit stream corresponding to the spatial region in operation 616 is selected, and in the current video bit stream of which the size of the image has already been confirmed, the current bit stream is maintained with respect to the temporal layer and the SNR layer (operation 642).

That is, since the current buffer state is larger than the predetermined buffer state and thus the network situation is smooth ($B>B_T$) and since the current RTT is larger than the predetermined $RTT_T$ and thus the transmission delay through the network is also smooth ($RTT>RTT_T$), the current bit stream is maintained with respect to the bit streams of the respective layers.

Also, if the RTT value is smaller than the threshold value ($RTT<RTT_T$) as the result of comparison, the specified spatial layer bit stream corresponding to the spatial region in operation 616 is selected, and in the current video bit stream of which the size of the image has already been confirmed, the layer position of the current SNR layer bit stream is increased up to the upper layer with respect to the SNR layer.

That is, since the current buffer state is larger than the predetermined buffer state and thus the network situation is smooth ($B>B_T$) and since the current RTT is smaller than the predetermined $RTT_T$ value and thus the transmission delay through the network is not smooth ($RTT<RTT_T$), the layer position of the SNR layer bit stream in the current bit stream is increased up to the upper layer.

Through the above-described process, an optimum layer position is selected by adjusting the respective layer positions of the video stream on the basis of the network situation where the mobile terminal that intends to perform the video stream service is located, and the bit stream corresponding to the layer positions selected in the respective layers is extracted (operation 646). The respective bit streams extracted in operation 646 are generated as one bit stream, and the generated bit stream is transmitted to the mobile terminal (operation 648).

As described above, according to an exemplary embodiment, the channel adaptive video transmission method, the apparatus using the same, and the system providing the same have been proposed to perform the above-described operations. While the aspects have been shown and described with reference to certain exemplary embodiments thereof, it will be understood by those skilled in the art that various changes in form and details may be made therein without departing from the spirit and scope of the exemplary embodiments as defined by the appended claims.

What is claimed is:

1. A channel adaptive video transmission method comprising:
receiving state information relating to performances of respective mobile terminals from at least one mobile terminal that intends to perform a video stream service through a wireless network;
determining a size of an image by selecting a specified spatial layer bit stream on the basis of the state information of the mobile terminal from a plurality of spatial layer bit streams generated at different bit rates during encoding of the bit stream;
selecting a specified time and a signal to noise ratio (SNR) layer bit stream by increasing or decreasing a time of the image and a layer position of the SNR layer bit stream on the basis of network parameters included in the state information of the mobile terminal; and
transmitting the bit stream generated by extracting the specified spatial layer bit stream of the selected layer to the mobile terminal.

2. The video transmission method as claimed in claim 1, wherein the state information of the mobile terminal comprises CPU information of the mobile terminal, memory information, a size of a display screen, a resolution of the display screen, and network state information of the mobile terminal.

3. The video transmission method as claimed in claim 1, wherein the network parameters are buffer state of the mobile terminal and a round trip time (RTT) that indicates a round trip time of a packet through the network.

4. The video transmission method as claimed in claim 1, wherein the video stream encoding is a scalable video coding (SVC) type video coding that supports multi-dimensional scalability of time, space, and signal-to-noise ratio (SNR).

5. The video transmission method as claimed in claim 1, wherein the step of increasing or decreasing the time of the image and the layer position of the SNR layer bit stream comprises:
comparing a buffer state included in the network parameters of the mobile terminal with a predetermined buffer state threshold value and comparing a round trip time (RTT) value with a predetermined RTT threshold value;

discriminating the layer position of the SNR bit stream and decreasing the layer position of the temporal layer bit stream if the comparing the buffer state with the predetermined buffer state threshold value determines that the buffer state is smaller than the buffer state threshold value;

increasing a number of frames by calculating a current bit rate, discriminating the layer position of the SNR layer bit stream, and determining whether the layer position of the temporal layer bit stream is decreased if the RTT value is smaller than the RTT threshold value when the buffer state is smaller than the buffer state threshold value based on the comparing the buffer state and the buffer state threshold value;

maintaining the current bit stream if the RTT value is larger than the RTT threshold value in a state where the buffer state is larger than the buffer state threshold value based on the comparing of the buffer state and the buffer state threshold value; and increasing the layer position of the SNR layer bit stream if the RTT value is smaller than the RTT threshold value in a state where the buffer state is larger than the buffer state threshold value based on the comparing of the buffer state and the buffer state threshold value.

6. The video transmission method as claimed in claim 5, wherein the step of increasing or decreasing the time of the image and the layer position of the SNR layer bit stream further comprises decreasing the layer position of the temporal layer bit stream if the layer position of the SNR layer bit stream is lowermost in the state where the buffer state is smaller than the buffer state threshold value and the RTT value is smaller than the RTT threshold value.

7. A channel adaptive video transmission apparatus comprising:
an encoder which encodes a high picture quality digital video stream, and outputs the video stream;
a wireless module which receives state information relating to performances of respective mobile terminals from at least one mobile terminal through a wireless network;
a processor which executes an image size determination unit and a control unit,
wherein the image size determination unit is configured to determine a size of an image by selecting a specified spatial layer bit stream based on the state information of the at least one mobile terminal output from the wireless module from spatial layer bit streams of the video streams output from the encoder, and
wherein the control unit is configured to select a specified time and a signal to noise ratio (SNR) layer bit stream from the video stream of which the image size has been determined by increasing or decreasing time of the image and a layer position of the SNR layer bit stream based on network parameters included in the state information of the at least one mobile terminal, and transmits a bit stream generated by extracting the specified spatial layer bit stream of the selected SNR layer bit stream to the mobile terminal.

8. The video transmission apparatus as claimed in claim 7, wherein the encoder performs a scalable video coding (SVC) type video coding that supports multi-dimensional scalability of time, space, and signal-to-noise ratio (SNR).

9. The video transmission apparatus as claimed in claim 7, wherein the control unit of the processor further comprises:
a first comparison unit configured to compare a buffer state included in the network parameters of the at least one mobile terminal with a predetermined buffer state threshold value, and if the predetermined buffer state threshold value is larger than the buffer state, outputs the buffer state to a second comparison unit, and if the predetermined buffer state threshold value is smaller than the buffer state, outputs the buffer state to a third comparison unit;

the second comparison unit configured to compare a round trip time (RTT) value included in the network parameters of the at least one mobile terminal with a predetermined RTT threshold value, and if the RTT value is larger than the predetermined RTT threshold value, to discriminate the layer position of the SNR layer bit stream, to determine and output whether the layer position of the temporal layer bit stream is decreased according to the layer position, and if the RTT value is smaller than the predetermined RTT threshold value, configured to increase a number of frames by calculating a current bit rate, to discriminate the layer position of the SNR layer bit stream, to determine and output whether the layer position of the temporal layer bit stream is decreased according to the layer position;

the third comparison unit configured to compare the RTT value included in the network parameters of the mobile terminal with the predetermined RTT threshold value, and if the RTT value is larger than the predetermined RTT threshold value, maintains the current bit stream, while if the RTT value is smaller than the predetermined RTT threshold value, increases and outputs the layer position of the SNR layer bit stream; and a scalable video coding (SVC) extraction unit configured to extract specified layer bit streams output from the second and third comparison units and outputs one bit stream.

10. The video transmission apparatus as claimed in claim 9, wherein if the layer position of the SNR layer bit stream is lowermost, decreases the layer position of the temporal layer bit stream.

11. A system for providing a video transmission service comprising:
a server recognizing network situations and performance of a plurality of mobile terminals using state information relating to performances of respective mobile terminals received from the mobile terminals through a wireless network,
comparing the state information of the mobile terminals with a predetermined threshold value, selecting a specified layer bit stream by increasing or decreasing a layer position of the bit stream for at least one layer, extracting and transmitting the selected specified layer bit stream to the mobile terminals; and
the mobile terminals transmitting their own state information to the server through the wireless network.

12. The system as claimed in claim 11, wherein the state information of the mobile terminals comprises CPU information of the mobile terminal, memory information, a size of a display screen, a resolution of the display screen, and network state information including a buffer state of the mobile terminal and a round trip time (RTT) value.

13. A video transmission method comprising:
receiving state information relating to performances of respective mobile terminals from at least one mobile terminal that intends to perform a video stream service through a wireless network;
selecting optimum content from a plurality of content of which sizes of images and picture qualities discriminate from one another based on the state information of the at least one mobile terminal; and transmitting a bit stream generated by extracting the bit stream from the selected content, to the mobile terminal.

14. The video transmission method as claimed in claim 13, wherein the state information of the mobile terminal comprises CPU information of the mobile terminal, memory information, a size of a display screen, a resolution of the display screen, and network state information of the mobile terminal.

15. The video transmission method as claimed in claim 13, wherein the step of selecting the optimum content comprises:
   comparing a buffer state included in the network parameters of the mobile terminal with a predetermined buffer state threshold value and comparing a round trip time (RTT) value with a predetermined RTT threshold value;
   discriminating a layer position of a signal to noise ratio (SNR) bit stream and determining whether the layer position of a temporal layer bit stream is decreased if the buffer state is smaller than the buffer state threshold value as a result of the comparing;
   increasing a number of frames by calculating a current bit rate, discriminating the layer position of the SNR layer bit stream, and determining whether the layer position of the temporal layer bit stream is decreased according to if the RTT value is smaller than the RTT threshold value in a state where the buffer state is smaller than the buffer state threshold value as a result of the comparing; and
   increasing the layer position of the SNR layer bit stream if the RTT value is smaller than the RTT threshold value in a state where the buffer state is larger than the buffer state threshold value as the result of the comparing.

* * * * *